Patented Oct. 31, 1933

1,933,193

UNITED STATES PATENT OFFICE 1,933,193

PROCESS OF RECOVERING METALS

Fredus A. Thurston, Chicago, Ill.

No Drawing. Application June 22, 1928
Serial No. 287,649

3 Claims. (Cl. 209—176)

My invention relates to process of recovering metals from ore, or similar operations.

One of the objects of the invention is to provide a simple, practical and advantageous method of the kind specified.

Another object of the invention is to provide an advantageous process utilizing the affinity of mercury for certain metals to accomplish the desired separation or recovery.

Another object of the invention is to secure simplicity and low cost of operation.

In carrying out the process in accordance with my invention, I take a quantity of the substance or material, such as ore, preferably in a pulverized form, which substance or material contains the metal or metals to be recovered and also contains, of course, the other substances or materials which are not desired and which are to be separated and disposed of. The various metals to be recovered have an affinity for mercury, whereas the other materials do not.

A quantity of cleansing fluid, such as ammonium fluoride or acetic acid or potash compounds, or any other suitable cleansing fluid, of which there are a large number, is then added to the pulverized substance, enough such cleansing fluid being added to saturate the substance thoroughly. To this compound there is then added a quantity of mercury, more than enough to coat all the metals present, the mercury, I find, adhering readily to the metal or metals, because of the use of cleansing fluid.

The compound thus formed is then heated, as for example, by placing it in a retort and this heating is continued until some of the excess mercury is evaporated, there being mercury present to coat all of the metal or metals, such coating adding additional weight, of course, to such metal or metals.

This heating process not only indicates the sufficiency of mercury but vaporizes the cleansing fluid which in this state is better able to reach and act upon the particles of metal to be cleaned; the mercury also at the same time absorbs some heat and is thus rendered thinner and can thus more efficiently attack the values to form a more thorough amalgamation therewith. Since water, according to applied science, will at atmospheric pressure vaporize at approximately 212° F., and mercury at approximately 662° F., it will be understood that in approaching a temperature necessary to vaporize the mercury, most of the cleansing solution will have evaporated, and in so doing will have had an opportunity to co-mingle very completely.

The mass is then cooled and removed from the retort and broken up or triturated. More metal cleansing fluid or substance is then preferably applied and then the materials are thoroughly dried. They are then placed on a mercury surface in a more or less powdered condition and preferably are subjected to more or less force or action, as by pounding them with a pounding device of some sort, or by gravity or otherwise. The metal particles thereupon become part of the mass of mercury and that part of the original substance having no affinity for mercury will be thrown off. This leaves the desired metal or metals combined with the mercury and their separation from the mercury is accomplished by any one of the well-known processes of separating mercury from metals. The desired metal or metals may then be recovered and used, and the undesired materials thrown away.

The process is simple, convenient, efficient, inexpensive, and is free from the objectionable features of cyanide and like processes.

It will be understood that changes and modifications may be made without departing from the spirit of the invention.

What I claim is:

1. A metal recovering process which consists in employing mercury to unite with the desired metals and in also employing a cleansing element for the material to be treated and also in heating the mercurized mass and also in applying force to the cooled mercurized mass to break up the same, and in further applying a cleansing fluid and then thoroughly drying, then mechanically pulverizing the same.

2. A metal recovering process which consists in cleansing the substance to be treated, adding more than sufficient mercury to coat the metal therein, heating the substance until some mercury is evaporated, breaking up the remaining mass and again subjecting the same to cleanser treatment and then thoroughly drying the mass, then breaking it up preparatory to removing the undesired materials.

3. A metal recovering process which consists in preparing the substance to be treated in pulverized form, applying a cleansing fluid to the same, subjecting the same to mercury treatment, heating the resultant mass, and then again subjecting the same to cleanser treatment.

FREDUS A. THURSTON.